United States Patent
Sugiue

(10) Patent No.: US 10,038,870 B2
(45) Date of Patent: Jul. 31, 2018

(54) ELECTRONIC DEVICE AND INFORMATION PROCESSING PROGRAM

(75) Inventor: Yuki Sugiue, Tokyo (JP)

(73) Assignee: Saturn Licensing LLC, New York, NY (US)

( * ) Notice: Subject to any disclaimer, the term of this patent is extended or adjusted under 35 U.S.C. 154(b) by 627 days.

(21) Appl. No.: 12/932,651

(22) Filed: Mar. 2, 2011

(65) Prior Publication Data
US 2011/0239247 A1 Sep. 29, 2011

(30) Foreign Application Priority Data
Mar. 23, 2010 (JP) ................................ P2010-066493

(51) Int. Cl.
*H04N 5/445* (2011.01)
*H04N 21/41* (2011.01)
(Continued)

(52) U.S. Cl.
CPC ..... *H04N 5/44582* (2013.01); *H04N 21/4126* (2013.01); *H04N 21/4223* (2013.01);
(Continued)

(58) Field of Classification Search
CPC . H04H 60/45; H04M 3/4211; H04N 21/4223; H04N 21/44008; H04N 21/4532;
(Continued)

(56) References Cited

U.S. PATENT DOCUMENTS 6,064,381 A * 5/2000 Harel .................... G06F 9/4446
434/118
6,862,741 B1 * 3/2005 Grooters ......................... 725/39
(Continued)

FOREIGN PATENT DOCUMENTS

CN 101427209 A 5/2009
CN 101582981 A 11/2009
(Continued)

OTHER PUBLICATIONS

Fasbender A. et al: 'Phone-controlled Delivery of NGN Services into Residential Environments', [Online] Sep. 16, 2008, pp. 196-203, XP031442370 Retrieved from the Internet: <URL:http://ieeexplore.ieee.org/search/wrapper.jsp?arnumber=4756434>.*
(Continued)

*Primary Examiner* — Benjamin R Bruckart
*Assistant Examiner* — Jen-Shi Huang
(74) *Attorney, Agent, or Firm* — Lerner, David, Littenberg, Krumholz & Mentlik, LLP

(57) ABSTRACT

There is provided an electronic device and an information processing program, which may improve user's convenience in operation using an electronic manual. The electronic device includes: a first determination section selecting one operation mode from one or more kinds of operation modes which are provided to operate the electronic device, and determining the selected operation mode as an operation mode to be executed; and a second determination section determining, in response to an input signal from a user, manual data of operation procedure for the determined operation mode in execution, as transmission information to be transmitted to a user terminal device.

13 Claims, 16 Drawing Sheets

(51) Int. Cl.
*H04N 21/4223* (2011.01)
*H04N 21/431* (2011.01)
*H04N 21/442* (2011.01)
*H04N 21/45* (2011.01)
*H04N 21/488* (2011.01)

(52) U.S. Cl.
CPC ... *H04N 21/4312* (2013.01); *H04N 21/44218* (2013.01); *H04N 21/4532* (2013.01); *H04N 21/488* (2013.01); *H04N 21/44227* (2013.01)

(58) Field of Classification Search
CPC .. H04N 5/44; H04N 5/44582; H04N 21/4126; H04N 21/42204; H04N 21/44218; H04N 5/445; H04N 21/4312; H04N 21/44227; H04N 21/488
USPC .................................................. 725/37–61
See application file for complete search history.

(56) References Cited

U.S. PATENT DOCUMENTS

| | | | | |
|---|---|---|---|---|
| 7,719,438 | B2* | 5/2010 | Hardacker | G05B 15/02 340/10.1 |
| 7,952,467 | B2* | 5/2011 | Hardacker | G08C 17/02 340/12.22 |
| 8,198,988 | B2* | 6/2012 | Hardacker | H04L 63/0428 340/12.51 |
| 8,539,352 | B2 | 9/2013 | Takata et al. | |
| 2002/0042915 | A1 | 4/2002 | Kubischta et al. | |
| 2002/0073417 | A1* | 6/2002 | Kondo | H04N 7/002 725/10 |
| 2002/0104092 | A1* | 8/2002 | Arai | H04N 5/445 725/87 |
| 2002/0133823 | A1 | 9/2002 | Sekimoto et al. | |
| 2004/0268419 | A1 | 12/2004 | Danker et al. | |
| 2005/0289582 | A1* | 12/2005 | Tavares | G06K 9/00221 725/10 |
| 2006/0258289 | A1* | 11/2006 | Dua | G06F 17/30058 455/41.3 |
| 2007/0064091 | A1 | 3/2007 | Park | |
| 2007/0126884 | A1* | 6/2007 | Xu et al. | 348/220.1 |
| 2007/0174869 | A1* | 7/2007 | Kim | 725/37 |
| 2007/0271580 | A1* | 11/2007 | Tischer | H04H 60/07 725/35 |
| 2008/0033635 | A1* | 2/2008 | Obradovich et al. | 701/201 |
| 2008/0231762 | A1* | 9/2008 | Hardacker | H04N 5/4403 348/734 |
| 2009/0161027 | A1* | 6/2009 | Hardacker | G08C 17/02 348/734 |
| 2009/0199230 | A1* | 8/2009 | Kumar et al. | 725/32 |
| 2010/0014840 | A1 | 1/2010 | Nagai | |
| 2010/0222102 | A1* | 9/2010 | Rodriguez | G06Q 30/02 455/557 |
| 2010/0238183 | A1* | 9/2010 | Sakanaka | H04N 7/163 345/501 |
| 2010/0291970 | A1 | 11/2010 | Kawakami | |
| 2014/0111692 | A1* | 4/2014 | Sugiue | G06F 3/04842 348/569 |

FOREIGN PATENT DOCUMENTS

| | | |
|---|---|---|
| CN | 101621668 A | 1/2010 |
| JP | H05002587 A | 1/1993 |
| JP | H07336778 A | 12/1995 |
| JP | 2000197155 A | 7/2000 |
| JP | 2000253327 A | 9/2000 |
| JP | 2001166867 A | 6/2001 |
| JP | 2003005880 A | 1/2003 |
| JP | 2004334799 A | 11/2004 |
| JP | 2005100449 A | 4/2005 |
| JP | 2005522112 A | 7/2005 |
| JP | 2006085306 A | 3/2006 |
| JP | 2007140851 A | 6/2007 |
| JP | 2007255971 A | 10/2007 |
| JP | 2008109342 A | 5/2008 |
| JP | 2008141562 A | 6/2008 |
| JP | 2008283444 A | 11/2008 |
| JP | 2009-116483 A | 5/2009 |
| JP | 2009230195 A | 10/2009 |

OTHER PUBLICATIONS

Japanese Office Action for Application No. 2010-066493 dated Oct. 22, 2013.

Chinese Office Action for Application No. 201110063129.3 dated Sep. 23, 2014.

Japanese Search Report for Application No. 2010-066493 dated Oct. 16, 2013.

* cited by examiner

|  |  | MANUAL DATA DM | | |
|---|---|---|---|---|
|  |  | PROGRAM LIST (LARGE LETTERS) | PROGRAM (SMALL LETTERS) | AUDIOVISUAL PROGRAM RESERVATION (LARGE LETTERS) |
| FACE DATA | SEX | MALE | 2 | 4 | 4 |
| | | FEMALE | 4 | 3 | 2 |
| | AGE | TWENTIES | 1 | 4 | 3 |
| | | FORTHES | 4 | 4 | 1 |
| | | SIXTIES | 5 | 2 | 0 |
| | | ... | ... | ... | ... |
| | EXPRESSION | GAZE | 3 | 3 | 3 |
| | | SMILE | 2 | 2 | 2 |
| | | ... | ... | ... | ... |
| OPERATION MODE IN EXECUTION | PROGRAM LIST | | 5 | 5 | 5 |
| | AUDIOVISUAL PROGRAM RESERVATION | | 3 | 3 | 3 |
| | PC CONNECTION | | 0 | 0 | 0 |
| | IMAGE QUALITY SETTING | | 0 | 0 | 0 |
| | ... | | ... | ... | ... |

FIG. 14

ELECTRONIC DEVICE AND INFORMATION PROCESSING PROGRAM

CROSS-REFERENCE TO RELATED APPLICATION

The present application claims priority from Japanese Patent Application No. JP 2010-066493 filed in the Japanese Patent Office on Mar. 23, 2010, the entire content of which is incorporated herein by reference.

BACKGROUND OF THE INVENTION

Field of the Invention

The present invention relates to an electronic device performing information processing of an electronic manual used in operation of the electronic device and an information processing program used for such an electronic device.

Description of Related Art

In the past, an electronic device such as a TV (Television) apparatus has used a function (an electronic manual) to present a relevant operation procedure on a display screen in a display mode (an operation mode) for performing operation of setting or adjustment such as program list display, audiovisual program reservation or image quality setting. For example, a system or the like has been proposed to enable a manual or test tool necessary for repairing failure to be displayed on a display screen of a portable terminal in the case of failure of an electronic device (for example, see Japanese Unexamined Patent Publication No. 2009-116483).

SUMMARY OF THE INVENTION

However, when an electronic device itself has manual data of the operation procedure, only one of screens, a screen for an operation mode in execution (operation screen) and a screen showing the operation procedure (manual screen), is typically displayed. Therefore, when a user does not know the operation procedure or the like on an operation screen, the user needs to temporarily change the operation screen to a manual screen to learn content of the manual screen, and then return to the operation screen to perform operation. This leads to a heavy load and inconvenience for the user. Thus, it has been desired to achieve an electronic device improved in convenience, allowing a user to perform operation while seeing an electronic manual.

It is desirable to provide an electronic device and an information processing program, which may improve user's convenience in operation using an electronic manual.

An electronic device according to an embodiment of the invention includes a first determination section selecting one operation mode from one or more kinds of operation modes which are provided to operate the electronic device, and determining the selected operation mode as an operation mode to be executed, and a second determination section determining, in response to an input signal from a user, manual data of an operation procedure for the determined operation mode in execution, as transmission information to be transmitted to a user terminal device.

Here, "operation mode" means an information input/output mode for performing operation of setting, adjustment and the like to the electronic device. In addition, "manual data" includes a specific operation procedure of an operation mode as above, description of relevant functions, and the like.

An information processing program according to an embodiment of the invention allows a computer to execute first step of selecting one operation mode from one or more kinds of operation modes which are provided to operate an electronic device having the computer, and determining the selected operation mode as an operation mode to be executed, and a second step of determining, in response to an input signal from a user, manual data of an operation procedure for the determined operation mode in execution, as transmission information to be transmitted to a user terminal device.

In the electronic device and the information processing program according to the embodiments of the invention, when an input signal from a user is detected during execution of an operation mode, manual data of the operation mode in execution are determined as transmission information to be transmitted to a user terminal device. Consequently, manual data of a relevant operation procedure may be supplied to the user terminal device during execution of the operation mode.

According to the electronic device and the information processing program of the embodiments of the invention, one operation mode among one or more kinds of operation modes is determined as an operation mode to be executed, and manual data of the determined operation mode are determined as transmission information to be transmitted to a user terminal device based on an input signal from the user. Consequently, manual data of a relevant operation procedure may be supplied to the terminal device during execution of an operation mode, and therefore, for example, the user may advance operation in the operation mode at the electronic device while seeing the manual data at the terminal device. Accordingly, convenience for the user may be improved in operation using an electronic manual.

Other and further objects, features and advantages of the invention will appear more fully from the following description.

BRIEF DESCRIPTION OF THE DRAWINGS

FIG. 14 is a schematic diagram showing an example of a correspondence table shown in FIG. 13.

DETAILED DESCRIPTION OF THE PREFERRED EMBODIMENTS

Hereinafter, preferred embodiments of the invention will be described in detail with reference to drawings. Description is made in the following sequence.

1. First embodiment (example of transmission of manual data from TV apparatus to terminal device)
2. Modification 1 (example of additional transmission of operation condition of user)
3. Second embodiment (example of determination of transmission information depending on picture data of user)
4. Third embodiment (example of transmission of manual data of video camera through TV apparatus)

First Embodiment

Figure 1:
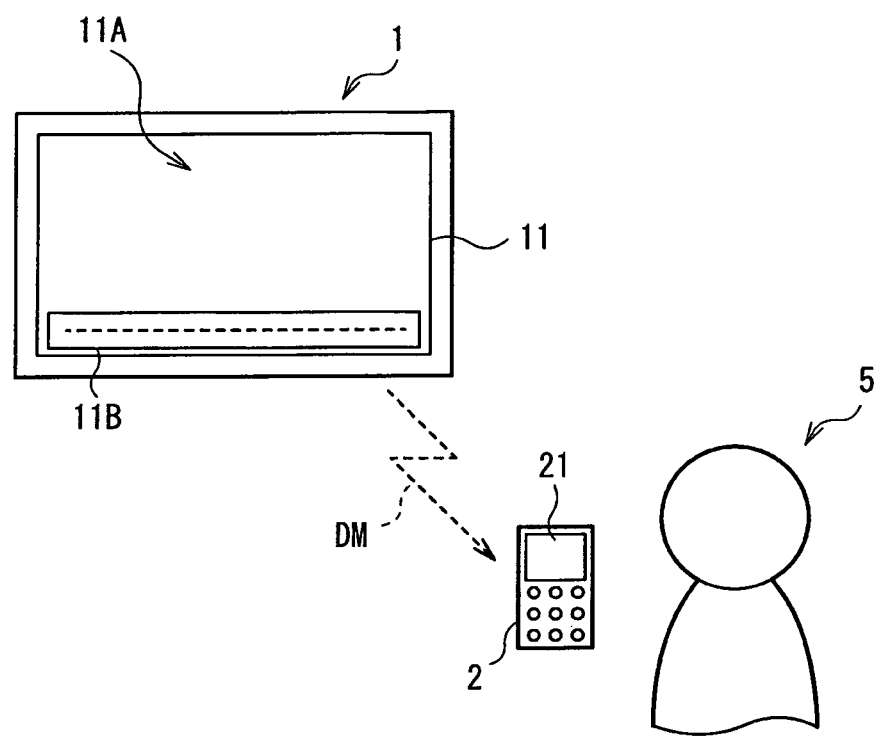
FIG. 1 is a schematic diagram showing an embodiment of a TV apparatus (electronic device) according to a first embodiment of the invention during execution of an operation mode.

FIG. 1 schematically shows an example of an aspect of an electronic device (TV apparatus 1) according to a first embodiment of the invention during execution of an operation mode. The TV apparatus 1 may display one or more kinds of operation modes on a display section 11, and has a function (electric manual) to display an operation procedure (manual) of a relevant operation mode. Here, "operation mode" means an information input/output mode for performing operation for setting, adjustment or the like to the TV apparatus 1, and, for example, includes a program list (program list browse), audiovisual program reservation, connection setting to a PC (Personal Computer) and image quality adjustment.

The TV apparatus 1 displays a screen for an operation mode (operation screen) or a screen showing a manual of the operation mode (manual screen) on the display section 11. The operation screen includes, for example, a screen informing that a program list is operable or a screen displaying a program list itself. The manual screen corresponding to such an operation screen includes a screen showing a specific procedure for performing operation for a program list (for example, operation for displaying a program list on a particular date or operation for expanding part of a program list). FIG. 1 shows a case where a manual screen 11A is displayed on the display section 11.

In addition, the TV apparatus 1 may display, for example, a message to a user 5 on a window screen 11B of the display section 11. For example, the window screen 11B presents a message indicating that manual data (manual data DM described later) may be taken out, as described later in detail.

An information processing program of the embodiment corresponds to various information processing functions realized in software of the TV apparatus 1 as an electronic device. Here, the software includes a program group that allows a computer in the electronic device to execute the information processing functions. For example, each program may be beforehand incorporated for use in special hardware or installed for use from a network or a recording medium into a general-purpose personal computer. Each of information processing programs of other embodiments described later also corresponds to various information processing functions realized in software of an electronic device of a corresponding embodiment, and may be used in the same way as above.

Configuration of TV Apparatus 1 and the Like

Figure 2:
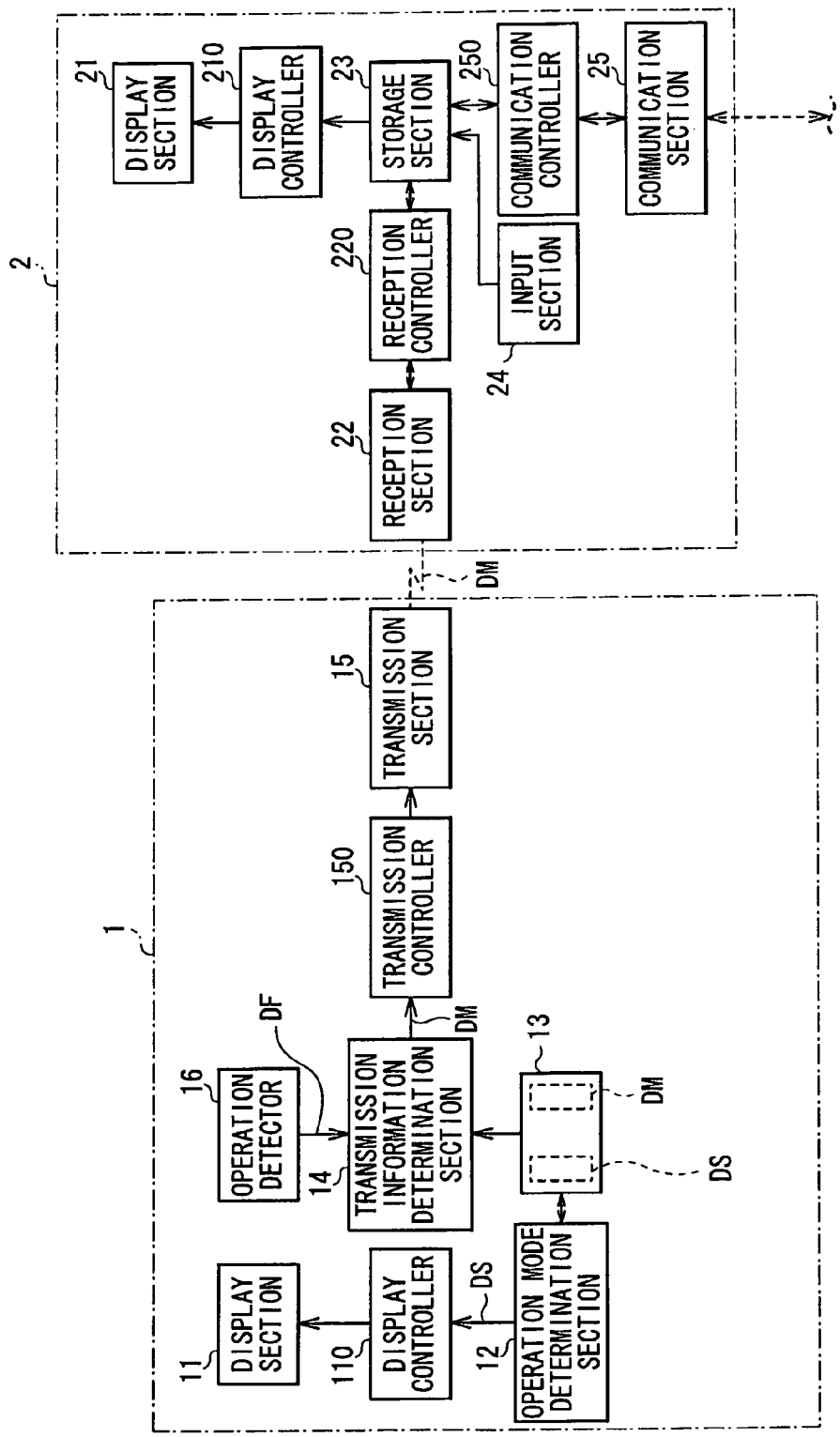
FIG. 2 is a block diagram showing a detailed configuration example of the TV apparatus and a terminal device shown in FIG. 1.

FIG. 2 shows a detailed block configuration of the TV apparatus 1 and a terminal device 2.

TV Apparatus 1

The TV apparatus 1 has the display section 11, a display controller 110, an operation mode determination section 12, a holding section 13, a transmission information determination section 14, a transmission section 15, a transmission controller 150 and an operation detector 16. A tuner and the like for achieving a TV function are omitted to be shown herein (the same is true in other embodiments described later).

The display section 11 has a display screen 11A used for displaying an operation screen described later (executing the operation mode), or displaying a manual screen described later. The display section 11 includes, for example, an LCD (Liquid Crystal Display), a PDP (Plasma Display Panel) or an organic EL (Electro Luminescence) display. The display controller 110 performs predetermined display control of the display section 11.

The holding section 13 is a storage section (memory) for holding data for displaying the operation screen (operation screen data DS) and data of an operation procedure of an operation mode (manual data DM). A single kind or several kinds of the operation screen data DS and the manual data DM may be held each. Hereinafter, description is made assuming that several kinds of the operation screen data DS and the manual data DM may be held each. A storage medium for the holding section 13 may include a fixed disc or a removable disc. In addition, various kinds of media such as a magnetic disc, an optical disc, a magneto-optical disc, and a semiconductor memory may be used as the medium. Alternatively, the data may be stored on the network.

The manual data DM are, for example, information including a specific execution procedure in executing operation in each operation mode, description of relevant functions, and the like. The manual data DM may represent such information by itself, or may be information showing an internet site having such information (for example, URL (Uniform Resource Locator).

The operation mode determination section 12 selects one operation mode from several kinds of operation modes and determines the selected operation mode as an operation mode to be executed. Specifically, the section 12 acquires one operation screen data DS from the several kinds of operation screen data DS held in the holding section 13, and supplies the acquired operation screen data DS to the display controller 110. The operation mode to be executed is determined (selected) by, for example, user operation (for example, operation using a remote control unit 10 described later), or determined manually. Alternatively, when a camera (for example, camera 18 described later) for taking an image of the user 5 is provided in the TV apparatus 1, content (for example, face data of the user 5) of picture data obtained by the camera may be used to determine the operation mode to be executed.

The operation detector 16 has a function to detect predetermined operation (take-out operation described later and input operation in an operation mode) by the user 5. Specifically, the operation detector 16 supplies detection data DF (data indicating whether operation is detected) as a result of such detection to the transmission information determination section 14.

The transmission information determination section 14 selects and acquires one of the several kinds of manual data DM held in the holding section 13, and determines the acquired manual data DM as transmission information to be transmitted to the terminal device 2 of the user 5. In the embodiment, in the case that the detection data DF supplied from the operation detector 16 indicate that take-out operation by the user 5 is detected, the section 14 determines manual data DM corresponding to a currently-executed operation mode as the transmission information. The manual data DM determined as the transmission information in this way are supplied to the transmission controller 150.

The transmission section 15 transmits the manual data DM determined as the transmission information to the terminal device 2. The transmission controller 150 supplies the manual data DM supplied from the transmission information determination section 14 to the transmission section 15, and controls transmission operation of the section 15. A method of transmitting the manual data DM by the transmission section 15 includes various (wireless) transmission methods and a method using a two-dimensional code expressing content of the manual data DM, and the like.

Terminal Device 2

The terminal device 2 includes a display section 21, a display controller 210, a reception section 22, a reception controller 220, a storage section 23, an input section 24, a communication section 25 and a communication controller 250. The terminal device 2 includes, for example, a mobile phone, PDA (Personal Digital Assistant) and a notebook PC (Personal Computer). However, the terminal device is not necessarily limited to such a portable terminal.

The reception section 22 receives the manual data DM transmitted from the transmission section 15 of the TV apparatus 1. The reception controller 220 controls reception operation of the reception section 22, and supplies the received manual data DM to the storage section 23.

The storage section 23 is a memory for holding various data including the manual data DM supplied from the reception controller 220, and various storage media may be used for the section 23 like the holding section 13.

The display section 21 is used to display the various data (including the manual data DM) held in the storage section 23, and may include various kinds of displays like the display section 11. The display controller 210 performs predetermined display control to the display section 21.

The input section 24 is used to input predetermined information into the terminal device 2, and includes, for example, a keyboard, a touchpad, or a touch panel.

The communication section 25 performs communication with the outside. For example, when the terminal device 2 is a mobile phone, the communication section 25 corresponds to a section performing call or communication operation. The communication controller 250 controls communication operation and the like of the communication section 25.

Operation and Effects of TV Apparatus 1

Next, operation and effects of the TV apparatus 1 of the embodiment are described.

Execution of Operation Mode

Figure 3:
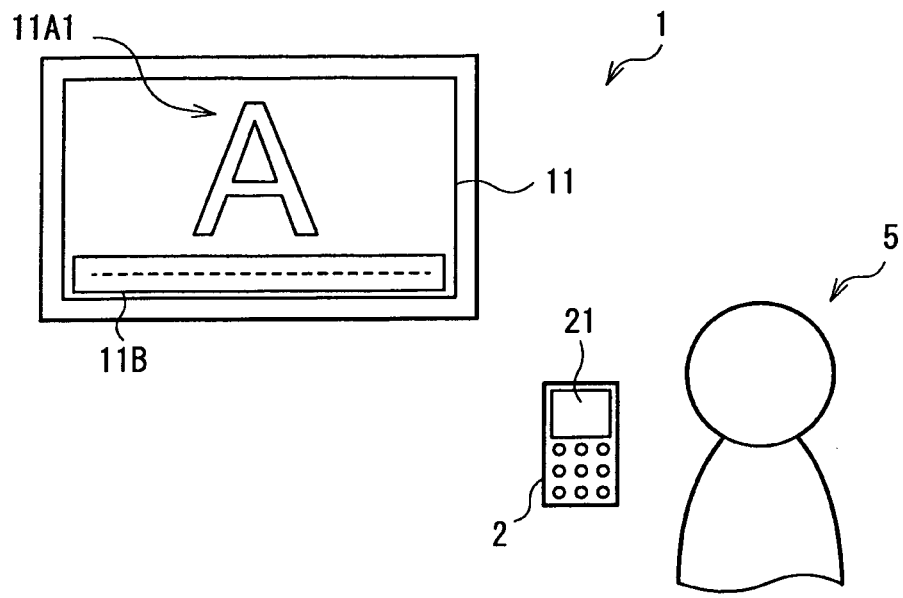
FIG. 3 is a schematic diagram showing operation screen display in the TV apparatus shown in FIG. 1.

In the TV apparatus 1, the operation mode determination section 12 selects one of the several kinds of operation modes held in the holding section 13 and determines the selected operation mode as an operation mode to be executed. Specifically, the section 12 selects and acquires one of the several kinds of operation screen data DS held in the holding section 13, and thus determines the acquired operation screen data DS as the operation mode to be executed, and supplies the determined data DS to the display controller 110. The display controller 110 performs display control of the display section 11 based on the inputted operation screen data DS, thereby an operation screen 11A1 is displayed on the display section 11 as shown in FIG. 3. Consequently, the user 5 may perform predetermined input operation on the displayed operation screen 11A1 (in an operation mode in execution). Hereinafter, description is made with operation for setting or adjustment (operation in an operation mode) on the operation screen 11A1 being called "operation M" for convenience in order to distinguish from other operation.

Change to Manual Screen

Figure 4:
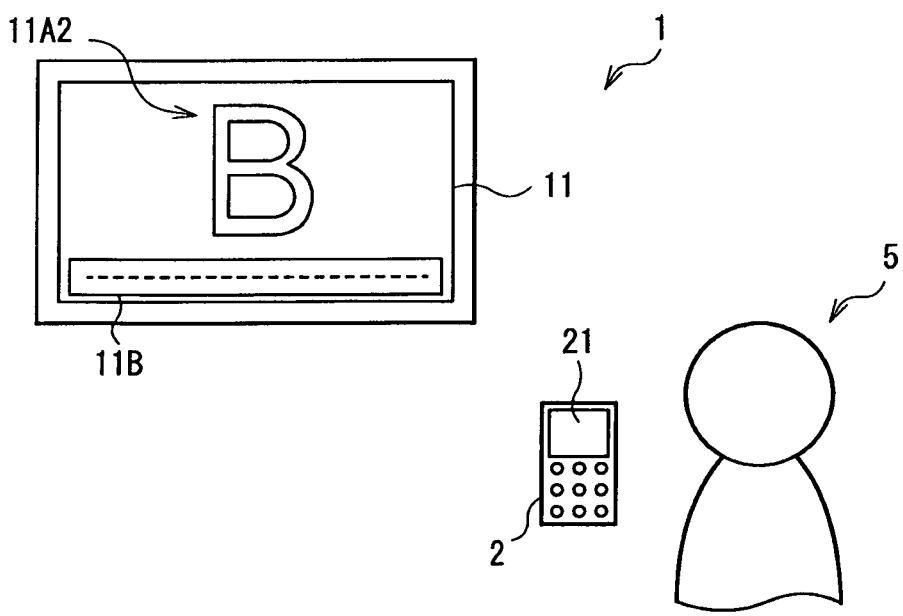
FIG. 4 is a schematic diagram showing manual screen display in the TV apparatus shown in FIG. 1.

When the user 5 performs input operation during such execution of an operation mode, for example, since the user 5 desires to know a specific operation procedure, a display screen on the display section 11 may be changed from the operation screen 11A1 to a manual screen 11A2 as shown in FIG. 4. Specifically, when the operation detector 16 detects an input signal for displaying the manual screen 11A2 as detection data DF, the display controller 110 supplies to the display section 11 manual data DM corresponding to operation screen data DS. Consequently, the user 5 may see an electronic manual of an operation mode in execution on the display section 11.

Transmission Operation of Manual Data DM

Figure 5:
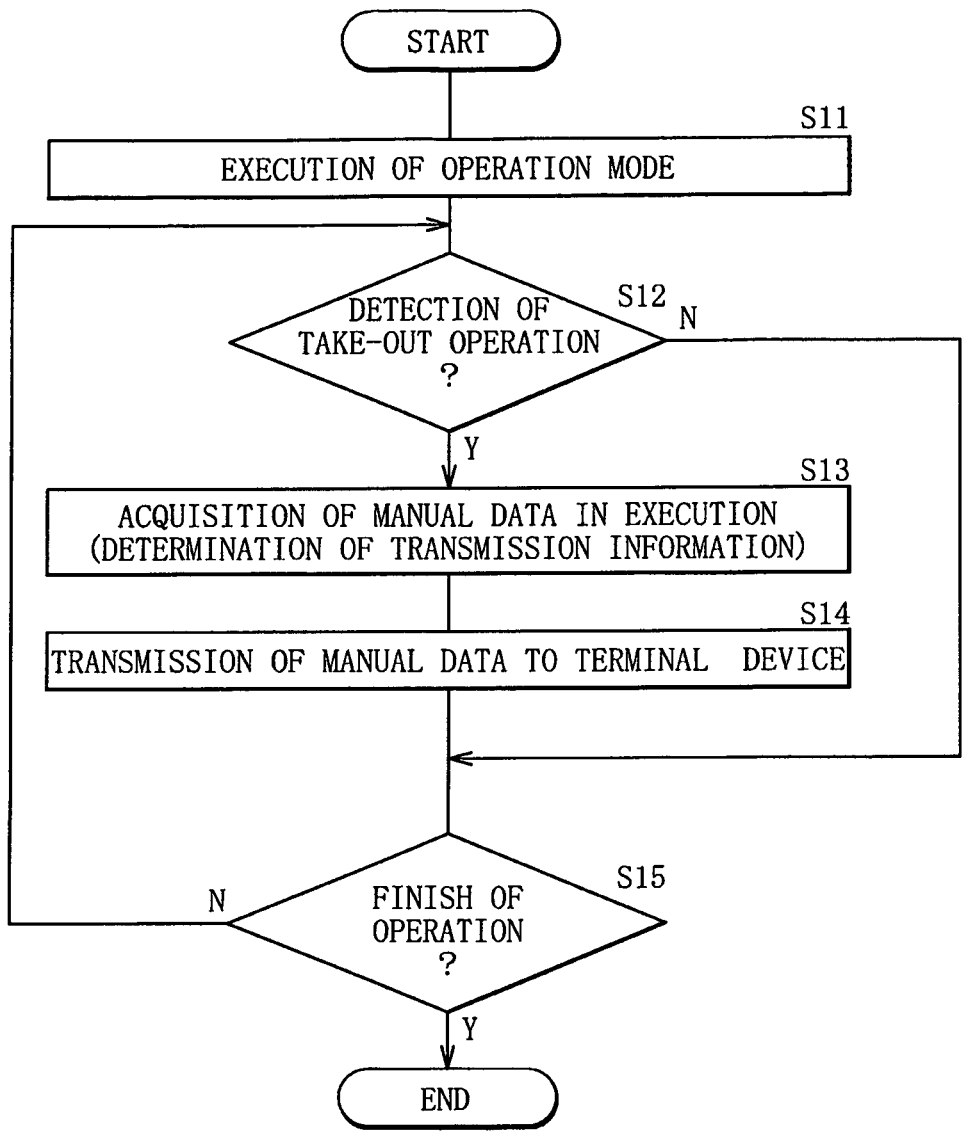
FIG. 5 is a flowchart showing an example of transmission operation of manual data in the TV apparatus shown in FIG. 1.

FIG. 5 shows flow of transmission operation of manual data DM in the TV apparatus 1. In the transmission operation, first, an operation mode is executed as above as prior operation (step S11). Here, the window screen 11B of the display section 11 desirably displays a message indicating that manual data DM corresponding to the operation mode in execution may be taken out.

For example, the user 5 confirms such a message, and then performs predetermined input operation (take-out operation), thereby the manual data DM corresponding to the operation mode in execution are transmitted to the user 5. Specifically, whether take-out operation by the user 5 is detected is determined (step S12).

Take-Out Operation

Figure 6A:
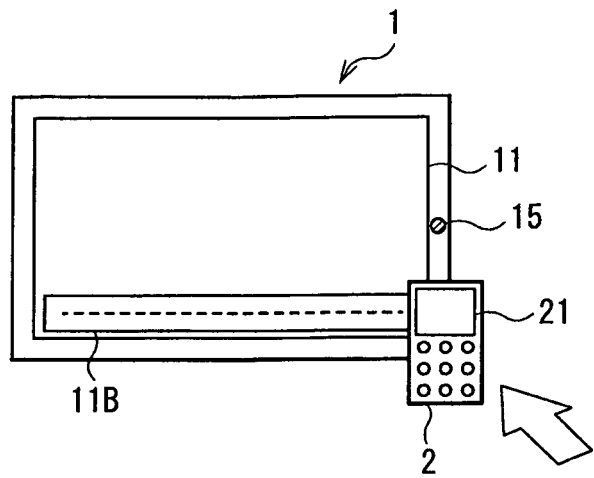
FIGS. 6A to 6C are schematic diagrams showing a specific example of take-out operation by a user.
Figure 6B:
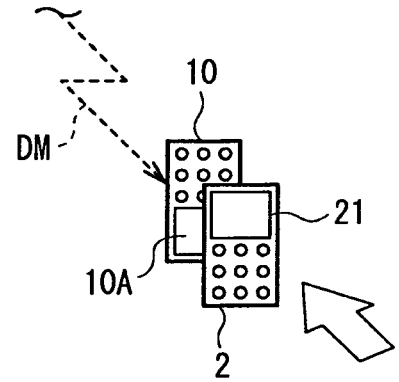

Such detection of take-out operation is executed, for example, in the following way. The operation detector 16 continually detects whether take-out operation is performed during execution of the operation mode. Specifically, for example, as shown in FIG. 6A, the operation detector 16 detects whether the terminal device 2 of the user 5 is placed near the transmission section 15, and thus detects presence of the take-out operation. Alternatively, when manual data DM are transmitted via a remote control unit (remote control unit 10) accompanying the TV apparatus 1, for example, as shown in FIG. 6B, the detection may be performed in the following way. That is, the operation detector 16 may detect whether the terminal device 2 is placed near a transmission section 10A of the remote control unit 10 to detect presence of the take-out operation.

Figure 6C:
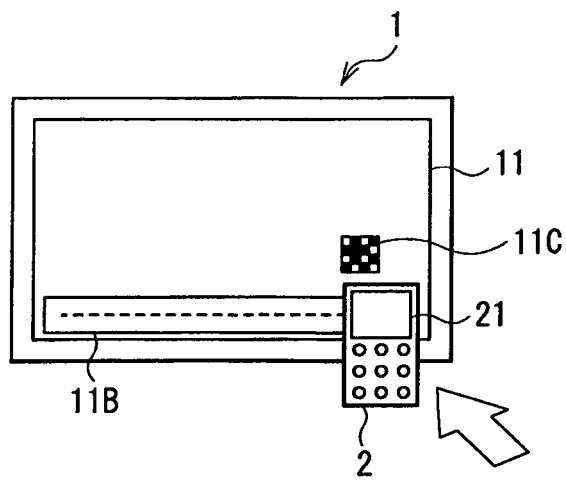
Figure 7:
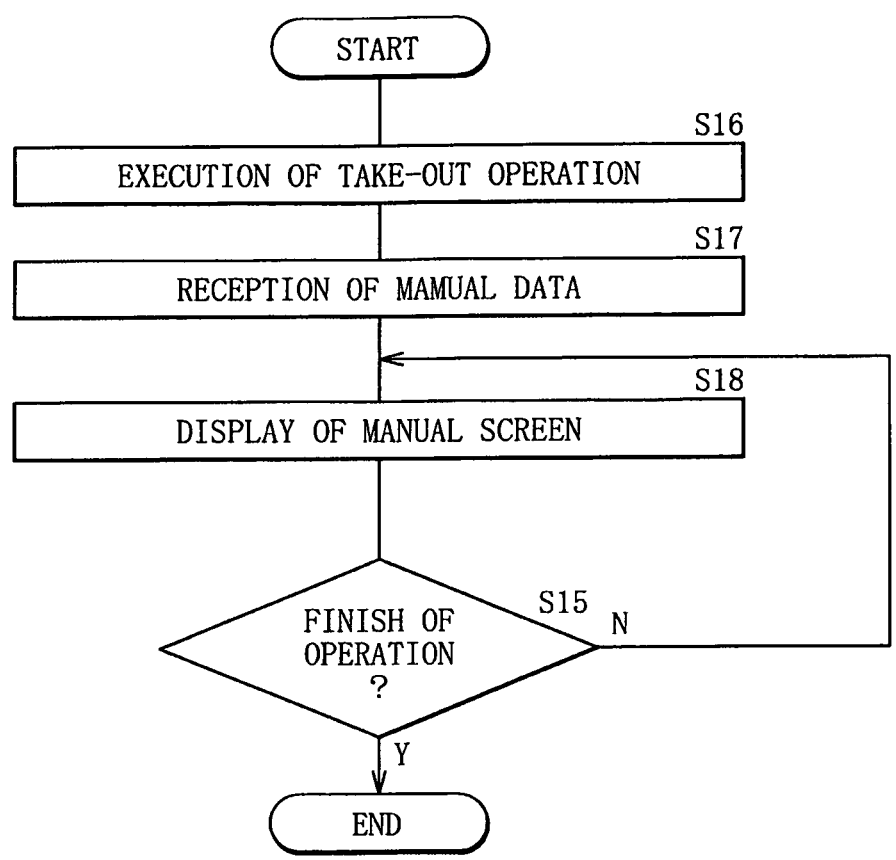
FIG. 7 is a flowchart showing an example of acquisition operation of manual data in the terminal device shown in FIG. 1.

Alternatively, for example, as shown in FIG. 6C, a predetermined two-dimensional code 11C may be displayed in the display section 11 so that the display section 11 serves as the transmission section 15. In other words, the operation detector 16 may detect whether the terminal device 2 is placed near the two-dimensional code 11C to detect presence of the take-out operation. Such a two-dimensional code 11C may be continuously displayed on a screen, or may be displayed only when predetermined input operation (for example, key input operation or touch input operation) is detected. The detection operation may be applied to a case of detecting presence of input operation (including operation M in an operation mode) by the user 5 other than such take-out operation.

Such a detection result on presence of take-out operation is continually supplied as detection data DF from the operation detector 16 to the transmission information determination section 14. The transmission information determination section 14 determines whether take-out operation is performed by the user 5 based on the detection data DF. The user 5 may perform the take-out operation during display of the operation screen 11A1 or the manual screen 11A2.

As a result, when the take-out operation is determined to be not performed (step S12: N), the following processing of steps S13 and S14 are not performed, and the flow advances to step S15.

When the take-out operation is determined to be performed by the user 5 (step S12: Y), the transmission information determination section 14 then selectively acquires manual data DM corresponding to an operation mode in execution from the several kinds of manual data DM held in the holding section 13 (step S13). The transmission information determination section 14 thus determines one manual data DM as transmission information to be transmitted to the terminal device 2 of the user 5. The manual data DM determined as transmission information in this way are supplied from the transmission information determination section 14 to the transmission controller 150. The transmission controller 150 controls the transmission section 15 to transmit the manual data DM to the terminal device 2 of the user 5 (step S14).

Then, whether the operation mode in execution is finished is determined (step S15). Specifically, the operation detector 16 continually determines based on the detection data DF whether an external input signal instructing finish of the operation mode in execution is detected. When the operation detector 16 determines the operation mode is not finished (step S15: N), the operation mode in execution is continued, and the flow returns to the step S12. When the section 16 determines the operation mode is finished (step S15: Y), transmission operation of the manual data DM is accordingly finished.

Operation at Terminal Device 2

At the terminal device 2, when the user 5 performs the take-out operation (for example, operation of placing the terminal device 2 near the transmission section 15 of the TV apparatus 1) (step S16), the reception section 22 receives the manual data DM (step S17). The received manual data DM are supplied to the storage section 23 via the reception controller 220. The display controller 210 controls the display section 21 to display a manual screen based on the manual data DM (step S18). Then, whether the operation mode is finished is determined as above (step S15), and when the operation mode is determined to be not finished (step S15: N), the flow returns to the step S18 (display of the manual screen is continued). When the operation mode is determined to be finished (step S15: Y), display of the manual screen is finished.

Figure 8:
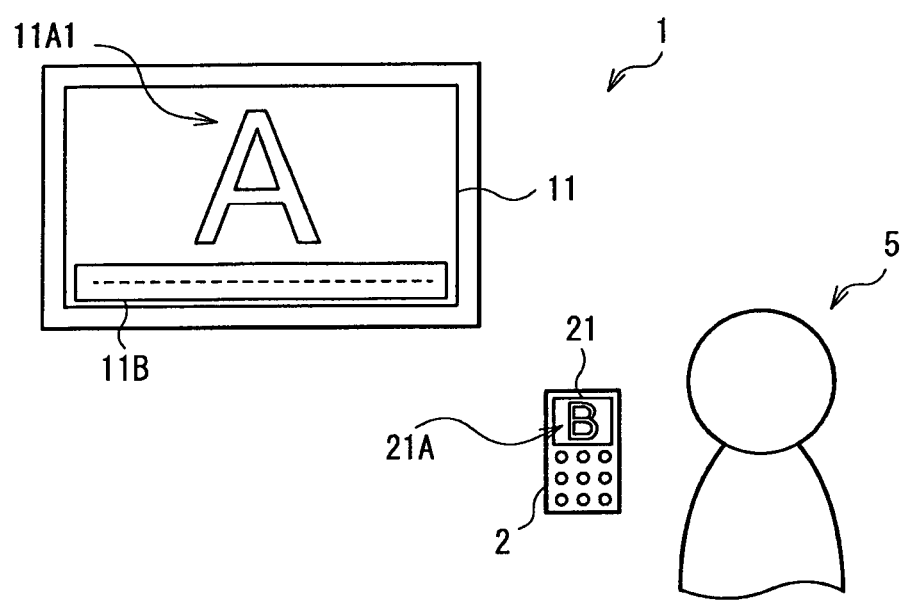
FIG. 8 is a schematic diagram for illustrating effects of the first embodiment.

Consequently, for example, as shown in FIG. 8, while the terminal device 2 displays a manual screen 21A based on the manual data DM, the TV apparatus 1 may display the operation screen 11A1. Therefore, the user 5 may perform operation M on the operation screen 11A1 using the terminal device 2 or the remote control unit 10 while seeing the manual screen at hand.

As hereinbefore, in the embodiment, the operation mode determination section 12 determines one of the several kinds of operation modes as an operation mode to be executed. When take-out operation is performed by the user 5 during execution of the determined operation mode, the transmission information determination section 14 determines manual data DM corresponding to the operation mode in execution as transmission information to be transmitted to the terminal device 2 of the user 5. Consequently, manual data of a relevant operation procedure may be supplied to the terminal device 2 during execution of an operation mode. As a result, for example, the user 5 may advance the operation M at the TV apparatus 1 while seeing a manual screen at the terminal device 2. Accordingly, the user 5 may operate the TV apparatus 1 (electronic device) using an electronic manual with improved convenience.

Next, a modification (modification 1) of the first embodiment is described. The same elements as in the first embodiment are designated by the same symbols, and description of them is appropriately omitted.

Modification 1

In the modification, manual data DM corresponding to an operation mode in execution are transmitted as transmission information from the TV apparatus 1 to the terminal device 2 as in the first embodiment, and then information of an operation condition is additionally transmitted to the terminal device 2. Specifically, the following transmission operation is performed.

Transmission Operation of Manual Data and Operation Condition

Figure 9:
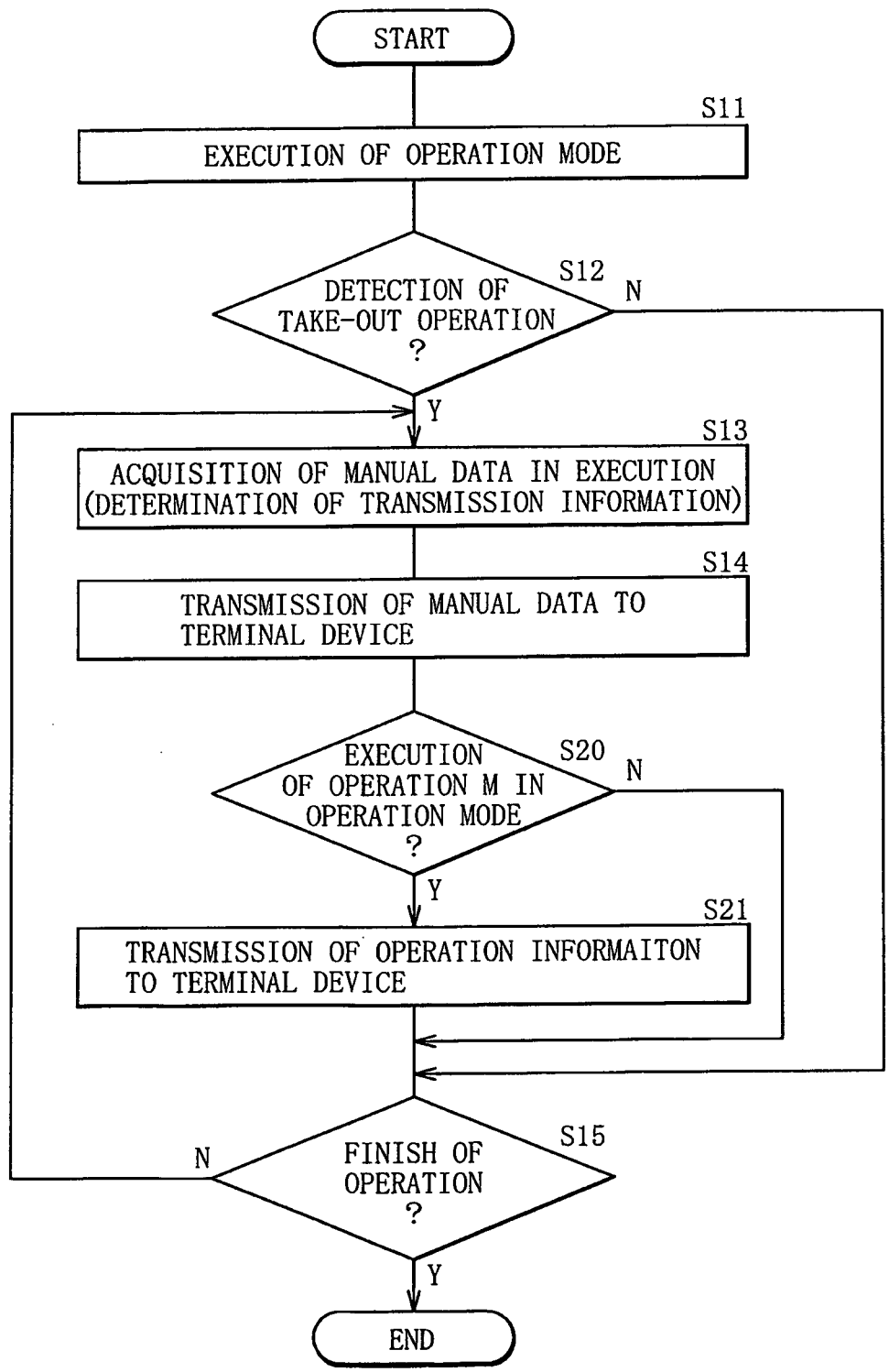
FIG. 9 is a flowchart showing an example of transmission operation of manual data according to modification 1.

As shown in FIG. 9, in the TV apparatus 1, first, when take-out operation is detected during execution of an operation mode, manual data DM corresponding to the operation mode are determined as transmission information, and the manual data DM are transmitted to the terminal device 2 according the same steps S11 to S14 as in the first embodiment.

However, in the modification, when manual data DM are transmitted to the terminal device 2 in response to take-out operation by the user 5 as above, whether operation M is performed in a subsequently-executed operation mode is determined (step S20). Specifically, the operation detector 16 continually determines whether the operation M is performed based on the detection data DF. As a result, when the operation detector 16 determines the operation M is not performed, the following step S21 is not performed, and the flow advances to step S15 in which whether the operation mode is finished is determined. When the operation detector 16 determines the operation M is performed (step S20: Y), the transmission information determination section 14 determines information (operation information) of a relevant operation condition (for example, progress of the operation M such as start, deviation and completion) as transmission information. The operation information is transmitted to the terminal device 2 via the transmission controller 150 and the transmission section 15 (step S21).

Then, whether the operation mode is finished is determined as above (step S15), and when the operation mode is determined to be not finished (step S15: N), the flow returns to the step S13. When the operation mode is determined to be finished (step S15: Y), transmission operation of information of the manual data DM and of the operation condition is accordingly finished.

For example, in the case that the reception section 22 of the terminal device 2 is connected to the transmission section 15 of the TV apparatus 1 via wireless LAN or the like, information of the operation condition and a control signal for changing a manual screen, which is displayed on the terminal device 2, depending on the operation condition are transmitted whenever the operation M is detected until the operation mode in execution is finished.

Operation at Terminal Device 2

Figure 10:
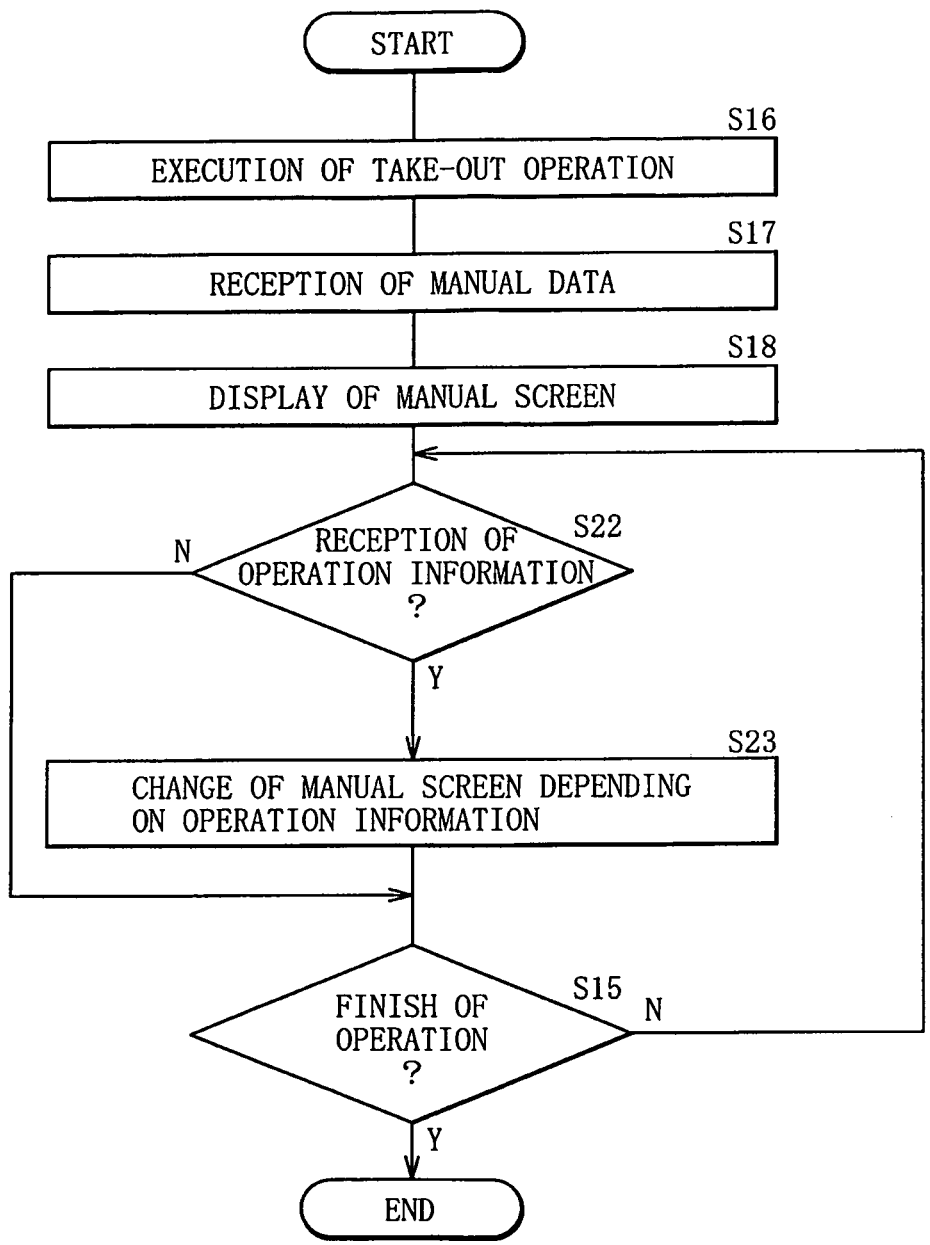
FIG. 10 is a flowchart showing an example of operation at the terminal device corresponding to the transmission operation shown in FIG. 9 (via wireless LAN).

At the terminal device 2, a manual screen is automatically changed (updated) in correspondence to the operation condition according to such transmission operation in the TV apparatus 1. Specifically, as shown in FIG. 10, according to the same steps S16 to S18 as in the first embodiment, manual data DM are received in response to execution of take-out operation, and a manual screen is displayed on the display section 21 based on the received manual data DM. After the manual screen is displayed, whether the operation information is received from the TV apparatus 1 is determined (step S22), and when the operation information is not received (step S22: N), the following step S23 is not performed, and the flow advances to the step S15 in which whether the operation mode is finished is determined. When the operation information is received (step S22: Y), the manual screen displayed on the display section 21 is changed (updated) according to the control signal from the TV apparatus 1.

For example, in the case that operation M to be performed in a particular operation mode is advanced in multiple steps, when the operation M is advanced, a screen is changed to a manual screen showing a subsequent procedure, and when the operation M is returned, the screen is changed to a manual screen showing a previous procedure. Alternatively, when a procedure is deviated during progress of the operation M, the screen may be changed to a manual screen showing a procedure to return to the operation M. In addition, when operation M in an operation mode in execution is completed, the screen may be changed to a manual screen presenting another relevant operation mode or a manual screen showing a procedure of operation M' in the relevant operation mode.

Then, whether the operation mode in execution is finished is determined (step S15), and when the operation mode is determined to be not finished (step S15: N), the operation mode is continued, and the flow returns to the step S13. When the operation mode is determined to be finished (step S15: Y), display of the manual screen is finished.

Figure 11:
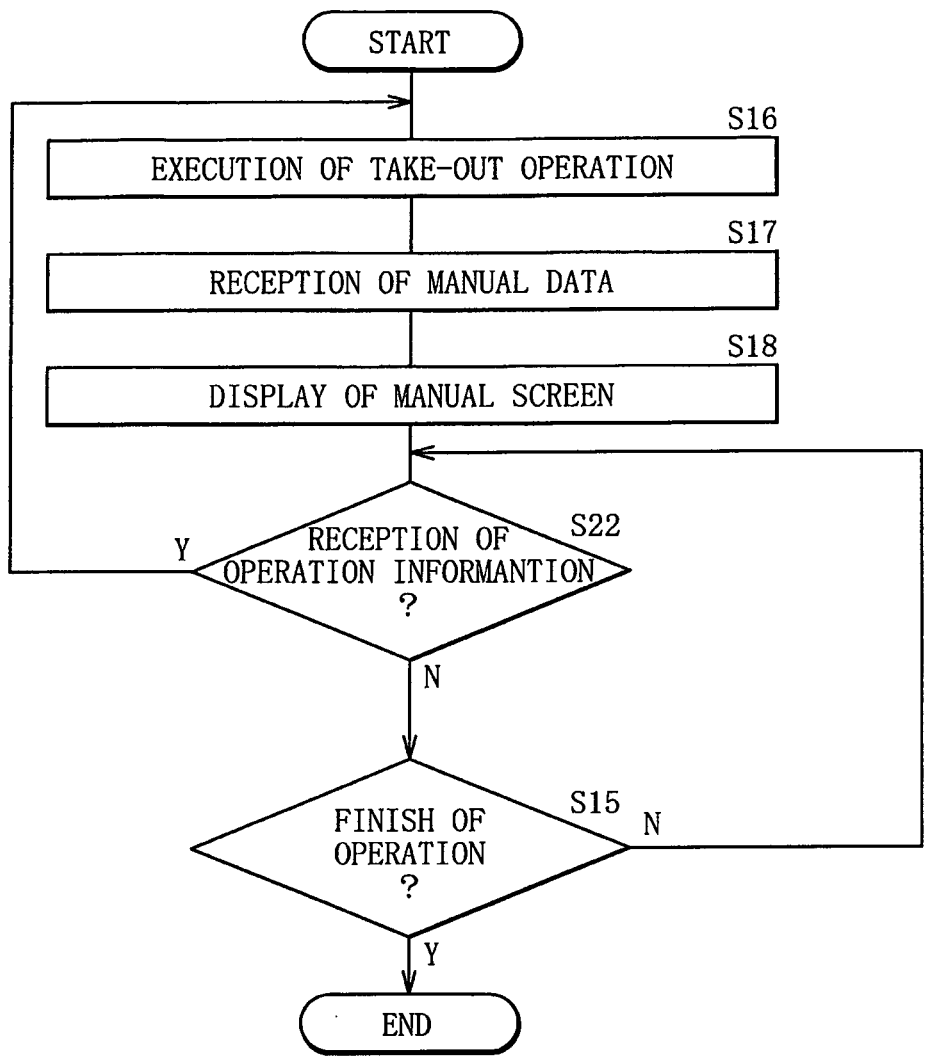
FIG. 11 is a flowchart showing another example of operation at the terminal device corresponding to the transmission operation shown in FIG. 9 (via a two-dimensional code).

In the case that transmission information is transmitted from the TV apparatus 1 to the terminal device 2 via, for example, a two-dimensional code, take-out operation is performed to acquire manual data DM whenever operation M is detected, namely, whenever operation information is received unlike the above case of transmission via wireless LAN. In other words, as shown in FIG. 11, after the same steps S16 to S18 as in the above are performed, whether the operation information is received is determined (step S22), and when the operation information is not received (step S22: N), the flow advances to the step S15 in which whether the operation mode is finished is determined. When the operation information is received (step S22: Y), the flow returns to the step S16, and take-out operation is performed.

Then, when the operation mode is determined to be not finished in the step S15 (step S15: N), the operation mode in execution is continued, and the flow returns to the step S22. When the operation mode is determined to be finished (step S15: Y), display of the manual screen is finished.

In the modification, the same effects as in the first embodiment may be obtained, and besides information of the operation condition is additionally transmitted after the manual data DM are transmitted to the terminal device 2, and therefore a manual screen on the terminal device 2 may be changed depending on an operation condition in an operation mode in execution. Accordingly, convenience for the user 5 is improved. Moreover, in the case that information is transmitted to the terminal device 2 via wireless LAN, a manual screen on the terminal device 2 may be changed automatically (without performing take-out operation whenever operation M is performed) depending on an operation condition, and consequently the user may perform smooth operation while seeing an electronic manual.

Next, embodiments (second and third embodiments) other than the first embodiment are described. The same elements as in the first embodiment are designated by the same symbols, and description of them is appropriately omitted.

Second Embodiment

Figure 12:
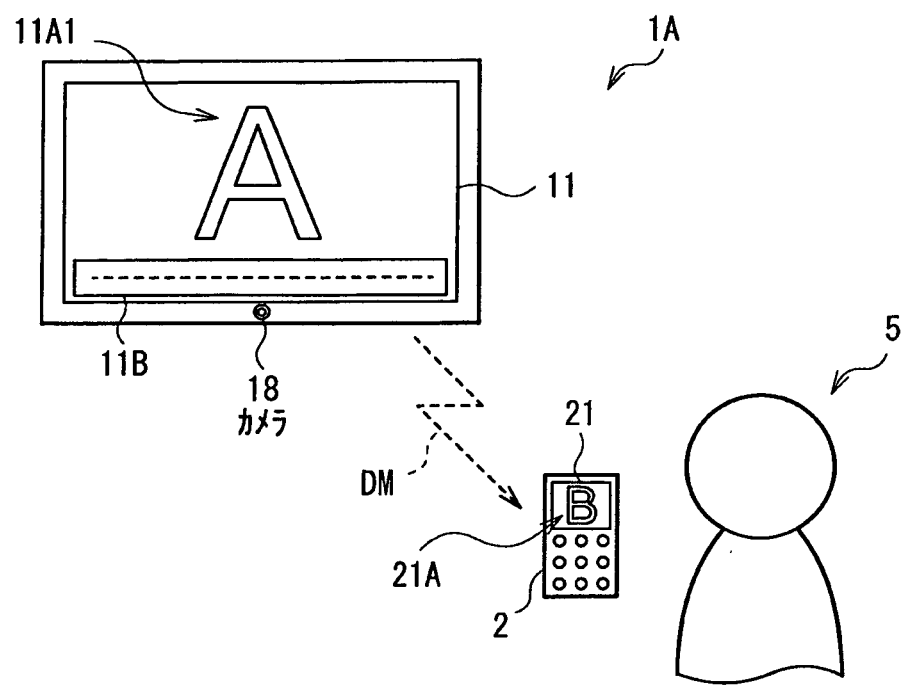
FIG. 12 is a schematic diagram showing an embodiment of a TV apparatus according to a second embodiment of the invention during execution of an operation mode.

FIG. 12 schematically shows an example of an aspect of an electronic device (TV apparatus 1A) according to a second embodiment during execution of an operation mode. The TV apparatus 1A is configured by adding a camera 18 and the like to the TV apparatus 1 in the first embodiment.

Configuration of TV Apparatus 1a and the Like

Figure 13:
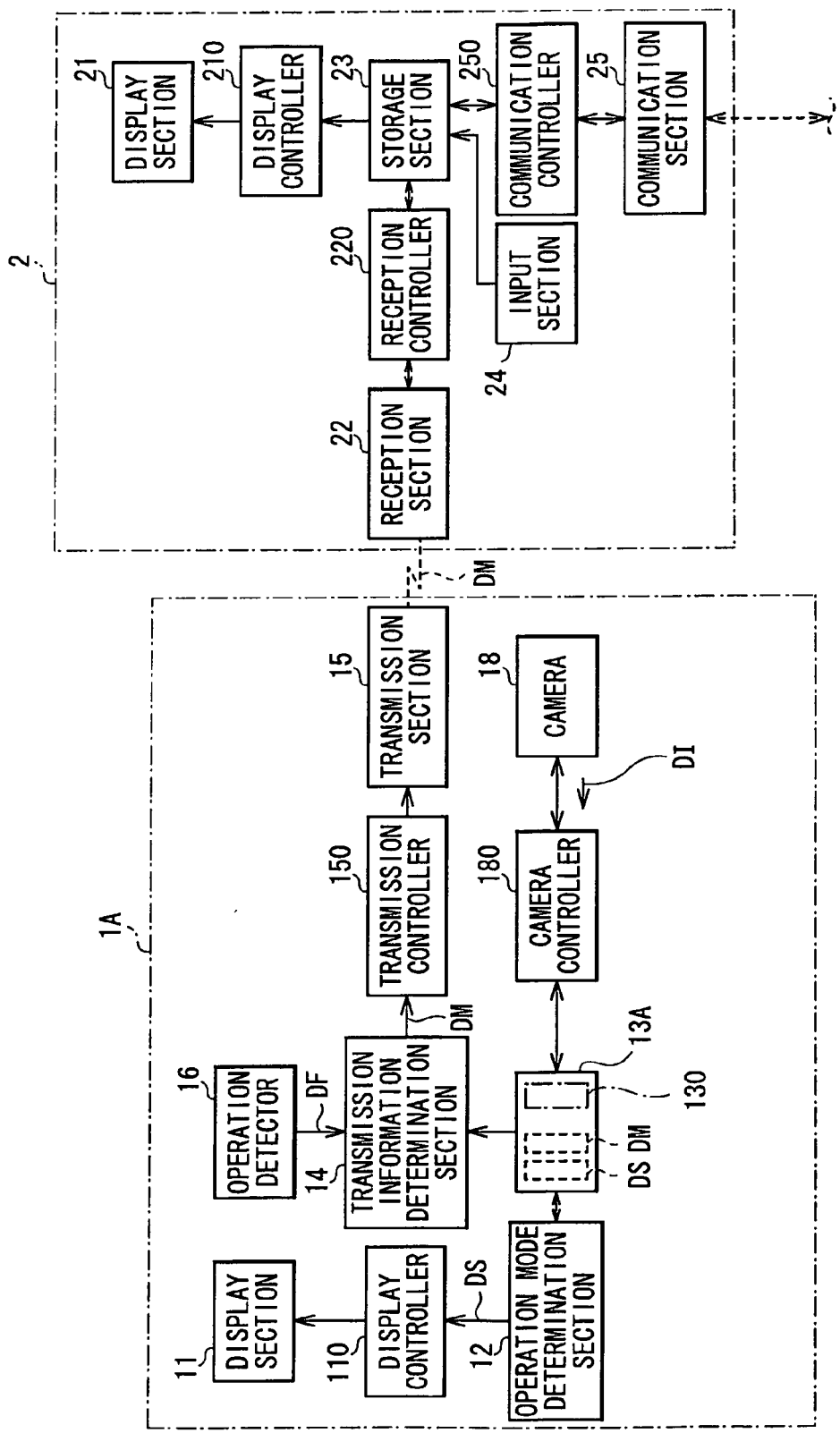
FIG. 13 is a block diagram showing a detailed configuration example of the TV apparatus and a terminal device shown in FIG. 12.

FIG. 13 shows a detailed block configuration of the TV apparatus 1A and a terminal device 2. Since a block configuration of the terminal device 2 is the same as in the first embodiment, description of the configuration is omitted.

TV Apparatus 1A

The TV apparatus 1A includes a display section 11, a display controller 110, an operation mode determination section 12, a holding section 13A, a transmission information determination section 14, a transmission section 15, a transmission controller 150, an operation detector 16, the camera (imaging section) 18 and a camera controller 180. In other words, the TV apparatus 1A has the holding section 13A in place of the holding section 13 of the TV apparatus 1 shown in FIG. 2, and additionally has the camera 18 and the camera controller 180.

The camera 18 is to take an image of a user 5 to acquire picture data DI of the user, and includes, for example, a CCD (Charge Coupled Device) imaging element or a CMOS (Complementary Metal Oxide Semiconductor) imaging element. The camera controller 180 controls imaging operation of the camera 18, and has a function to supply the picture data DI of the user 5 acquired by the camera 18 to the holding section 13A.

The holding section 13A is a memory for holding operation screen data DS, manual data DM and a predetermined correspondence table 130. The same storage medium as for the holding section 13 may be used for the holding section 13A.

FIG. 14 schematically shows an example of the correspondence table 130. The correspondence table 130 indicates a correspondence relationship between content of an operation mode in execution (hereinafter, simply called operation content) or user data (here, face data of the user 5) and manual data DM.

The operation mode in execution includes, for example, "program list", "audiovisual program reservation", "PC connection" and "image quality setting".

The user data (face data) includes, for example, items of "sex", "age" and "expression", and each item is further divided into a plurality of categories (sub-items). Specifically, "sex" has two categories of male and female, "age" has a plurality of generation categories (for example, twenties, forties and sixties), and "expression" is divided into categories of face expression of the user 5 in screen viewing, such as gaze and smile.

In the embodiment, several kinds of data are held as the manual data DM in the same way as in the first embodiment, and a plurality of kinds of manual data DM are assigned to one operation mode. For example, two kinds of manual data DM, data showing an operation procedure with relatively large letters (large letters) and data showing an operation procedure with relatively small letters (small letters), are held for each of operation modes such as "program list" and "audiovisual program reservation".

In the correspondence table 130, numerical values (points) for calculating a priority of each manual data DM are beforehand individually set by using operation content in execution and user data. For example, as shown in FIG. 14, points of 0 to 5 are set for each of categories of face data and for each of operation modes in execution in a column of each manual data DM. The points for priority calculation are set depending on difficulty in operation execution or use frequency of each operation mode, a connection between the operation modes, and typical operation tendency in correspondence to age or expression of the user 5, and the like. Such points may be general numerical values being beforehand set, or may be points being individually set depending on operation tendency or use frequency of an individual user 5. In the embodiment, the transmission information determination section 14 may use such a correspondence table 130 to determine appropriate manual data DM corresponding to the user 5 as transmission information, as described later in detail.

Operation and Effects of TV Apparatus 1A

In the embodiment, an operation mode is executed in the same way as in the first embodiment, and the following transmission operation of manual data DM is performed during execution of the operation mode.

Transmission Operation of Manual Data DM

Figure 15:
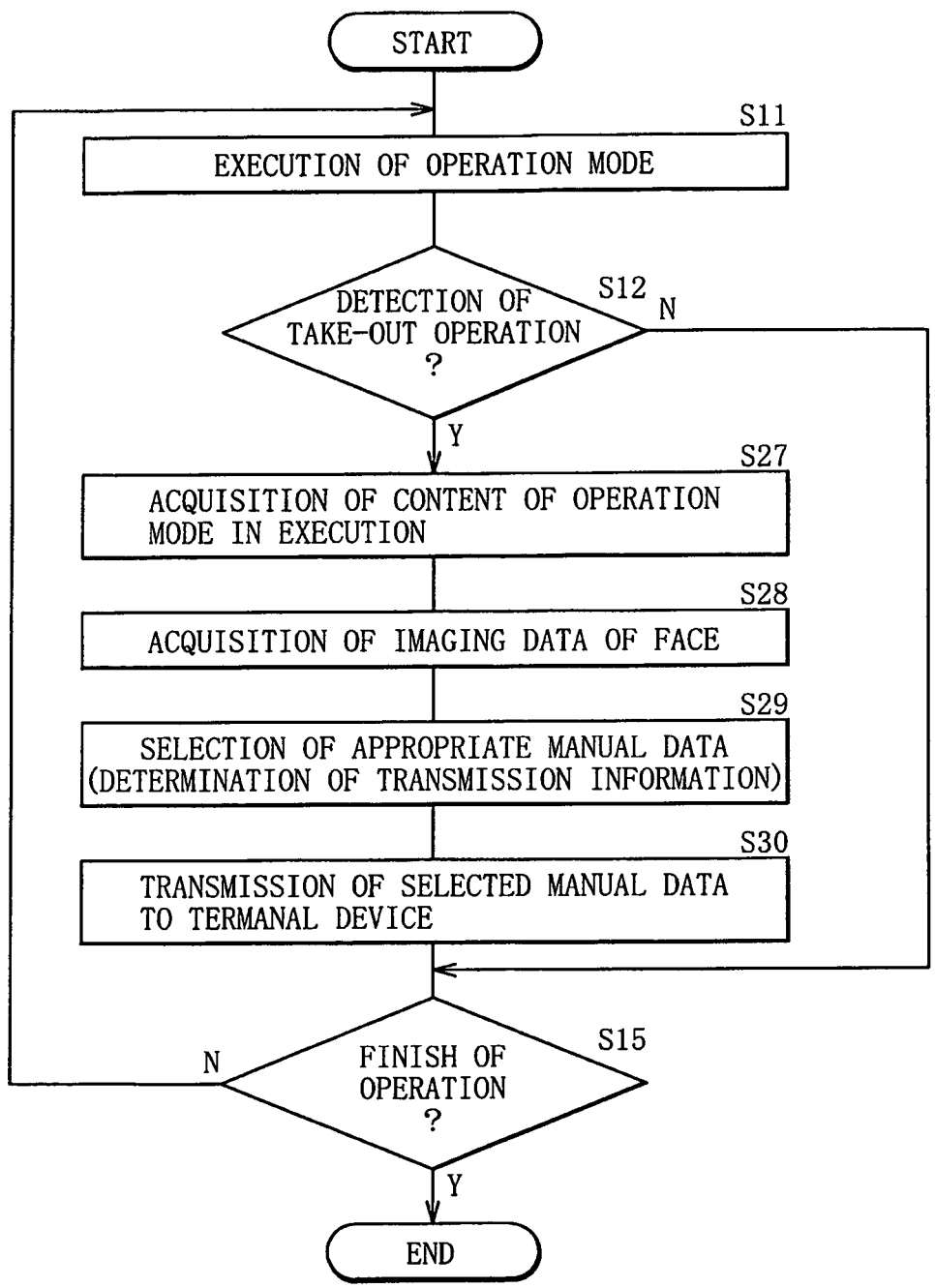
FIG. 15 is a flowchart showing an example of transmission operation of manual data in the TV apparatus shown in FIG. 10.

FIG. 15 shows in a flowchart transmission operation of manual data DM in the TV apparatus 1A. The same processing as in the first embodiment is designated by the same step number, and description of the processing is omitted.

In the transmission operation, the transmission information determination section 14 first executes an operation mode in the same way as in the first embodiment (step S11), and then determines whether take-out operation is detected (step S12). As a result, when take-out operation is not detected (step S12: N), the following processing of steps S27 to S30 are not performed, and the flow advances to step S15 in which whether the operation mode is finished is determined.

When take-out operation is detected (step S12: Y), the section 14 acquires content of the operation mode in execution (step S27). Specifically, the transmission information determination section 14 acquires currently-displayed operation screen data DS from several kinds of operation screen data DS held in the holding section 13A.

Next, the camera 18 is used to acquire face picture data DI (step S28). Specifically, the camera controller 180 controls the camera 18 to take an image of the user 5 (a face of the user 5), so that the face picture data DI is acquired. The picture data DI is supplied to the transmission information determination section 14 via the camera controller 180 and the holding section 13A. The transmission information determination section 14 extracts one or more of sex, age and expression of the user 5 based on the picture data DI. Hereinafter, description is made assuming that data of sex is sex data DO1, data of age is age data DO2, and data of expression is expression data DO3 among data (assumed as face data DO) obtained by extracting from the picture data DI.

The transmission information determination section 14 selects appropriate manual data DM for the user 5 based on the picture data DI (step S29). Specifically, the transmission information determination section 14 uses the acquired operation content in execution, the acquired face data DO and the correspondence table 130 to select appropriate one from the several kinds of manual data DM.

For example, the transmission information determination section 14 uses the correspondence table 130 shown in FIG. 14 to calculate a priority of each of the several kinds of manual data DM, and selects the highest-priority manual data DM. For details, when an operation mode in execution is "program list", and, for example, "female" as the sex data DO1, "sixties" as the age data DO2, and "gaze" as the expression data DO3 are extracted from the picture data DI of the user 5 respectively, categories (categories enclosed by dot lines in FIG. 14) corresponding to the respective data are focused for calculation of the priority. Specifically, as shown in the following, the sum of points set for respective categories of operation content in execution and points set for respective categories corresponding to face data DO of the user 5 for each manual data DM is assumed as a priority of each manual data DM. Consequently, the transmission information determination section 14 determines manual data DM of "program list (large letters)" with the highest-priority as transmission information to be transmitted to the terminal device 2. In other words, in the example, the manual data DM for displaying an operation procedure of a program list in large letters are determined to be appropriate for the user 5 and selected based on the respective data of sex (female), age (sixties) and expression (gaze) of the user 5 seeing a program list.

Program list (large letters): 4+5+3+5=17
Program list (small letters): 3+2+3+5=13
Audiovisual program reservation (large letters): 2+0+3+5=10

The manual data DM selected (determined) in this way are transmitted to the terminal device 2 via the transmission controller 150 and the transmission section 15 (step S30). Then, whether the operation mode is finished is determined (step S15), and when the operation mode is determined to be not finished (step S15: N), the flow returns to the step S12. When the operation mode is determined to be finished (step S15: Y), transmission operation of the manual data DM is accordingly finished.

As hereinbefore, in the embodiment, the operation content in execution, the face data DO obtained by extracting from the picture data DI, and the predetermined correspondence table 130 are used to transmit appropriate manual data DM for the user 5 to the terminal device 2. Therefore, the same effects as in the first embodiment are obtained, and besides an electronic manual being more convenient for the user 5 may be achieved.

Third Embodiment

Figure 16:
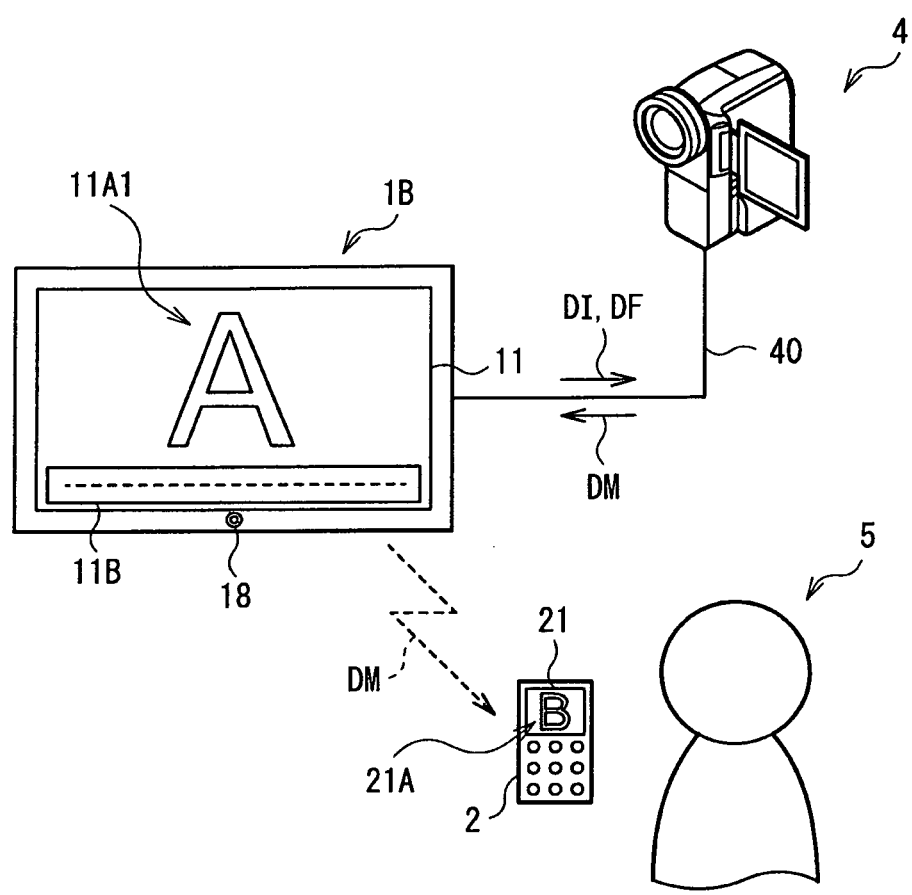
FIG. 16 is a schematic diagram showing an aspect of a video camera (electronic device) according to a third embodiment of the invention during execution of an operation mode.

FIG. 16 schematically shows an example of an aspect in an operation mode of an electronic device (video camera 4)

according to a third embodiment in conjunction with a TV apparatus 1B as a specific example of "external display device" of the invention. The video camera 4 is connected to the TV apparatus 1B via a predetermined wiring 40 (for example, HDMI (High-Definition Multimedia Interface) or USB (Universal Serial Bus)). In the embodiment, an electronic manual of operation of the video camera 4 is transmitted to a terminal device 2 of a user 5 via the TV apparatus 1B. In other words, an operation mode is executed in the video camera 4, and manual data DM corresponding to the operation mode are transmitted to the terminal device 2 via the TV apparatus 1B as a communication unit.

Configuration of Video Camera 4 and the Like

Figure 17:
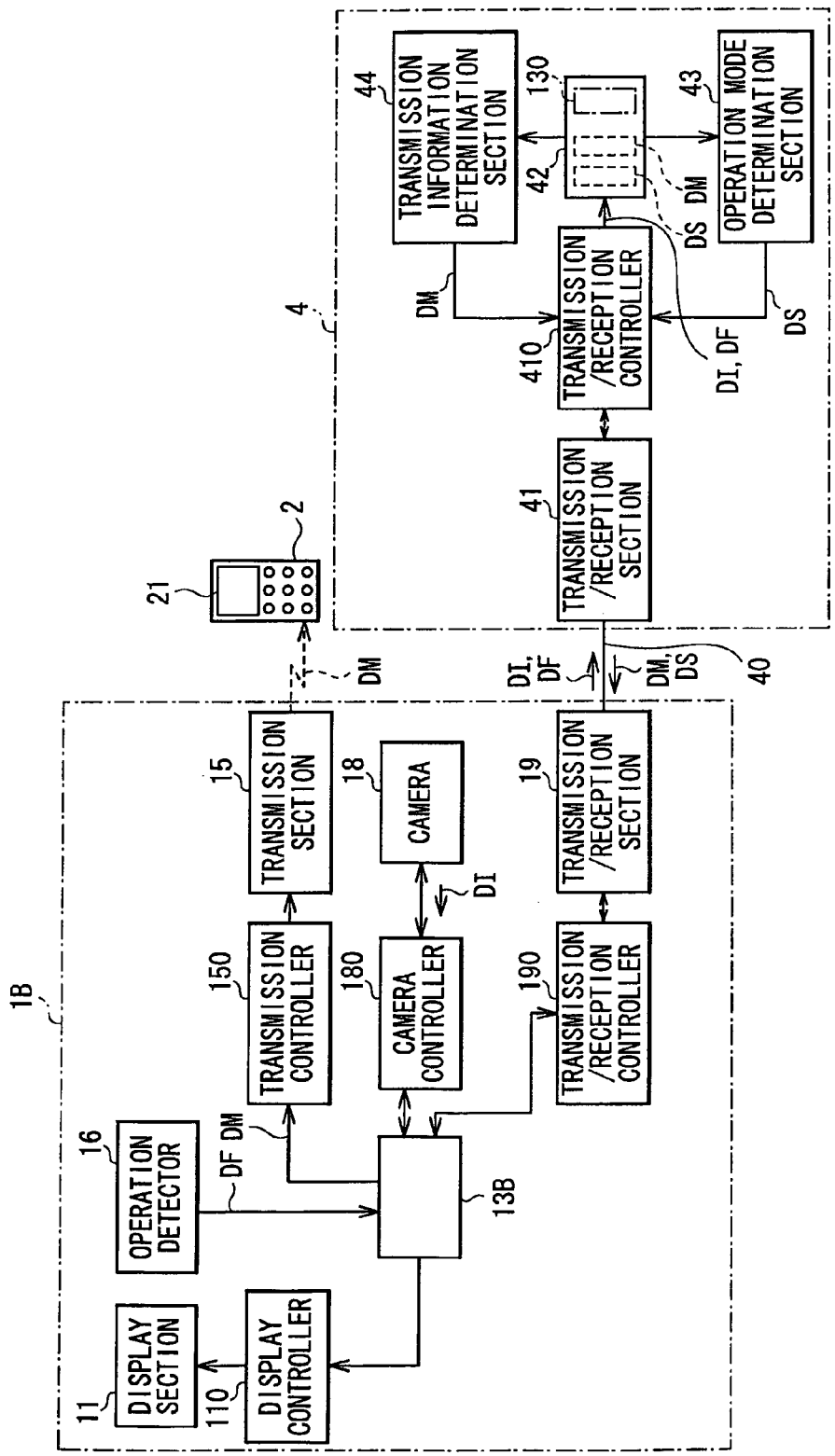
FIG. 17 is a block diagram showing a detailed configuration example of the video camera and a TV apparatus shown in FIG. 16.

FIG. 17 shows a detailed block configuration of the video camera 4 and the TV apparatus 1B. Since a block configuration of the terminal device 2 is the same as in the first embodiment, description of the configuration is omitted.

TV Apparatus 1B

The TV apparatus 1B includes a display section 11, a display controller 110, a holding section 13B, a transmission section 15, a transmission controller 150, an operation detector 16, a camera 18, a camera controller 180, a transmission/reception section 19 and a transmission/reception controller 190. In other words, the TV apparatus 1B has the holding section 13B in place of the holding section 13A of the TV apparatus 1A shown in FIG. 13, and additionally has the transmission/reception section 19 and the transmission/reception controller 190 with the operation mode determination section 12 and the transmission information determination section 14 being removed.

The holding section 13B is a memory for holding image display data and the like to be supplied to the display controller 110. The holding section 13B may include various storage media like the holding section 13 or 13A. In the following description, operation screen data DS, manual data DM, picture data DI and detection data DF are transmitted through the holding section 13B. However, the data may not be necessarily transmitted through the holding section 13B.

The transmission/reception section 19 has a function to transmit the picture data DI and the detection data DF to the video camera 4, and a function to receive the manual data DM and the operation screen data DS from the video camera 4. The transmission/reception controller 190 controls transmission/reception operation of the transmission/reception section 19, and has a function to transfer the picture data DI, the detection data DF, the manual data DM and the operation screen data DS between the transmission/reception section 19 and the holding section 13B.

Video Camera 4

The video camera 4 includes a transmission/reception section 41, a transmission/reception controller 410, a holding section 42, an operation mode determination section 43 and a transmission information determination section 44.

The transmission/reception section 41 has a function to receive the picture data DI and the detection data DF from the transmission/reception section 19 of the TV apparatus 1B, and a function to transmit the manual data DM and the operation screen data DS to the transmission/reception section 19. The transmission/reception controller 410 controls transmission/reception operation of the transmission/reception section 41. The transmission/reception controller 410 further has a function to transfer each of the picture data DI, the detection data DF, the manual data DM and the operation screen data DS between the transmission/reception section 41 and the holding section 42, the operation mode determination section 43 or the transmission information determination section 44.

The holding section 42 is a memory for holding the operation screen data DS, the manual data DM and the correspondence table 130. Various storage media may be used for the holding section 42 like the holding section 13.

The operation mode determination section 43 selects and acquires one of the operation screen data DS held in the holding section 42, and determines the acquired operation screen data DS as data for an operation mode to be executed, and supplies the determined data to the transmission/reception controller 410. A basic function of the operation mode determination section 43 is the same as that of the operation mode determination section 12.

The transmission information determination section 44 uses operation content in execution, face data DO obtained by extracting from picture data DI of the user 5, and the predetermined correspondence table 130 to determine transmission information to be transmitted to the terminal device 2. A basic function of the transmission information determination section 44 is the same as that of the transmission information determination section 14 in the second embodiment.

Operation and Effect of Video Camera 4 and the Like

Next, operation and effect of the video camera 4 and the TV apparatus 1B are described.

Execution of Operation Mode

In the video camera 4, the operation mode determination section 43 selects one of the several kinds of operation modes held in the holding section 42 and determines the selected operation mode as an operation mode to be executed. Specifically, the section 43 selects and acquires one of operation screen data DS held in the holding section 42, and thus determines the acquired operation screen data DS as data for the operation mode to be executed, and supplies the determined data DS to the transmission/reception section 41 via the transmission/reception controller 410. The transmission/reception section 41 transmits the operation screen data DS to be executed to the TV apparatus 1B. In the TV apparatus 1B, the transmission/reception section 19 receives the operation screen data DS, and supplies the data to the display section 11 via the transmission/reception controller 190, the holding section 13B and the display controller 110. Consequently, an operation screen 11A1 is displayed on the display section 11, and the user 5 may perform predetermined input operation on the displayed operation screen 11A1 (in the operation mode in execution). When the video camera 4 has a display section, the operation screen 11A1 may be displayed on the display section.

Transmission Operation of Manual Data DM

In the TV apparatus 1B, detection data DF acquired by the operation detector 16 are supplied to the transmission/reception section 19 via the holding section 13B and the transmission/reception controller 190. In addition, picture data DI acquired by the camera 18 are supplied to the transmission/reception section 19 via the camera controller 180, the holding section 13B and the transmission/reception controller 190. The detection data DF and the picture data DI are transmitted to the video camera 4 from the transmission/reception section 19, respectively.

In the video camera 4, the transmission/reception section 41 receives the detection data DF and the picture data DI, and supplies the respective data to the transmission information determination section 44 via the transmission/reception controller 410 and the holding section 42. The transmission information determination section 44 uses operation content in execution acquired from the holding section 42, face data DO obtained by extracting from the picture data DI and the correspondence table 130 held in the holding section 42 to determine transmission information to be transmitted to the terminal device 2. Manual data DM determined as the transmission information are supplied from the holding section 42 to the transmission/reception section 41 via the transmission information determination section 44 and the transmission/reception controller 410, and transmitted from the transmission/reception section 41 to the TV apparatus 1B.

The transmission/reception section 19 of the TV apparatus 1B receives the manual data DM, and supplies the manual data to the transmission section 15 via the transmission/reception controller 190, the holding section 13B and the transmission controller 150. The transmission section 15 transmits the manual data DM as the transmission information to the terminal device 2.

As hereinbefore, in the embodiment, transmission operation of the manual data DM to the terminal device 2 and acquisition operation of the picture data DI are indirectly performed during execution of an operation mode by using (via) the TV apparatus 1B (external display device) instead of the video camera 4 (electronic device) itself. Consequently, for example, even if an electronic device itself does not have a display section or a camera (imaging section), or even if an operation screen is too small though the device has a display section, the same effects as in the first or second embodiment may be obtained.

While the embodiment has been described assuming the second embodiment (a case of an electronic device with a camera), indirect operation using (via) an external display device may be performed in the first embodiment (a case of an electronic device without a camera).

While the invention has been described with several embodiments and modifications hereinbefore, the invention is not limited to the embodiments and the like, and various modifications or alterations may be made. For example, content or kinds of the data such as user data (face data), operation screen data, and manual data described in the embodiments and the like are not limitative, and other content or kinds may be used. Moreover, all of the three data, sex data DO1, age data DO2 and expression data DO3, are not necessarily used as the face data, and, for example, one or more of the three data may be used.

The block configurations of the TV apparatus, the terminal device and the video camera described in the embodiments and the like are not limitative, and other block configurations may be used. Furthermore, the above-mentioned electronic device, terminal device and external display device are not limitative, and the invention may be applied to other types of devices.

It should be understood by those skilled in the art that various modifications, combinations, sub-combinations and alterations may occur depending on design requirements and other factors insofar as they are within the scope of the appended claims or the equivalent thereof.

What is claimed is:

1. An electronic device, comprising:
    a first display section;
    a first determination section to select one operation mode from one or more kinds of operation modes which are provided to operate the electronic device, and determine the selected operation mode as an operation mode to be executed, the selected operation mode has a respective plurality of kinds of manual data associated therewith in which each kind thereof (i) pertains to a same operation procedure of the selected operation mode and (ii) has a presentation format associated therewith which is different from that of the other kind or kinds of the respective plurality of kinds of manual data;
    a display controller to cause a first screen to be displayed on the first display section corresponding to the determined operation mode when the determined operation mode is executed;
    a second determination section to perform priority calculations and to select, based on a result of the priority calculations, one kind of manual data from among the respective plurality of kinds of manual data as transmission information to be transmitted to a terminal device having a second display section; and
    a transmission section to transmit the transmission information, selected by the second determination section, for receipt by the terminal device to enable a second screen corresponding to the selected one kind of manual data to be displayed on the second display section,
    the second determination section is configured to perform the priority calculations by calculating a respective priority value for each kind of manual data based on the determined operation mode and data pertaining to a current user, and the second determination section is configured to select the respective kind of manual data having a highest priority value as the selected one kind of manual data, and
    during operation the electronic device causes the determined operation mode to be executed on the electronic device simultaneously with the transmitting of the selected one kind of manual data as the transmission information for reception by the terminal device, such that the first screen is displayed on the first display section simultaneously with the second screen being displayed on the second display section, in which the first screen which corresponds to the determined operation mode is different from the second screen which corresponds to the selected one kind of manual data.

2. The electronic device according to claim 1, wherein in the case that the transmission section detects user operation after transmitting the transmission information to the terminal device, the transmission section transmits records of operation condition to the terminal device.

3. The electronic device according to claim 1, wherein the data pertaining to the current user is picture data obtained by taking a picture of the current user.

4. The electronic device according to claim 3, wherein face picture data of the current user is the picture data.

5. The electronic device according to claim 4, wherein sex of the current user, age of the current user and expression data of the current user which are obtained from the face picture data are th data pertaining to the current user.

6. The electronic device according to claim 1 further comprising, a holding section holding the manual data for the one or more kinds of operation modes.

7. The electronic device according to claim 1, wherein the one kind of manual data includes at least one of (a) the operation procedure used in executing the determined operation mode or (b) information showing a site having the operation procedure used in executing the determined operation mode.

8. The electronic device according to claim 1, in which the respective plurality of kinds of manual data includes a first kind of manual data wherein letters are presented on the second screen in a first size and a second kind of manual data wherein letters are presented on the second screen in a second size which is different than the first size.

9. A computer readable non-transitory medium on which an information processing program is recorded, the information processing program causes an apparatus to execute:
   a step, performed by a first determination unit in the apparatus, of selecting one operation mode from one or more kinds of operation modes which are provided to operate the apparatus having a computer, and determining the selected operation mode as an operation mode to be executed, the selected operation mode having a respective plurality of kinds of manual data associated therewith in which each kind thereof (i) pertains to a same operation procedure of the selected operation mode and (ii) has a presentation format associated therewith which is different from that of the other kind or kinds of the respective plurality of kinds of manual data,
   a step of causing a first screen to be displayed on a first display section of the apparatus corresponding to the determined operation mode when the determined operation mode is executed;
   a step, performed by a second determination unit in the apparatus, of performing priority calculations and selecting, based on a result of the priority calculations, one kind of manual data from among the respective plurality of kinds of manual data as transmission information to be transmitted to a terminal device to enable a second screen corresponding to the determined manual data to be displayed on a second display section of the terminal device, and
   a step of transmitting the transmission information to the terminal device,
   the step performed by the second determination unit includes performing the priority calculations by calculating a respective priority value for each kind of manual data based on the determined operation mode and data pertaining to a current user, and selecting the respective kind of manual data having a highest priority value as the selected one kind of manual data, and
   the determined operation mode is executed on the apparatus simultaneously with the transmitting of the selected one kind of manual data as the transmission information for reception by the terminal device, such that the first screen is displayed on the first display section simultaneously with the second screen being displayed on the second display section, in which the first screen which corresponds to the determined operation mode is different from the second screen which corresponds to the selected one kind of manual data.

10. The computer readable non-transitory medium according to claim 9, wherein the information processing program further allows the computer to execute:
    a step of transmitting records of operation condition to the terminal device in the case that the user operation is detected after the transmission information is transmitted to the terminal device.

11. The computer readable non-transitory medium according to claim 9, wherein the data pertaining to the current user is picture data obtained by taking a picture of the current user.

12. The computer readable non-transitory medium according to claim 9, wherein the one kind of manual data includes at least one of (a) the operation procedure used in executing the determined operation mode or (b) information showing a site having the operation procedure used in executing the determined operation mode.

13. The computer readable non-transitory medium according to claim 9, in which the respective plurality of kinds of manual data includes a first kind of manual data wherein letters are presented on the second screen in a first size and a second kind of manual data wherein letters are presented on the second screen in a second size which is different than the first size.

* * * * *